(12) United States Patent
Rapoport et al.

(10) Patent No.: US 10,191,489 B1
(45) Date of Patent: Jan. 29, 2019

(54) CONTROL SYSTEMS FOR AUTONOMOUS SUBMERSIBLE STRUCTURES

(71) Applicant: X Development LLC, Mountain View, CA (US)

(72) Inventors: Evan Douglas Rapoport, Santa Cruz, CA (US); Rohinton Mehta, Fremont, CA (US)

(73) Assignee: X Development LLC, Mountain View, CA (US)

( * ) Notice: Subject to any disclaimer, the term of this patent is extended or adjusted under 35 U.S.C. 154(b) by 113 days.

(21) Appl. No.: 15/346,281

(22) Filed: Nov. 8, 2016

(51) Int. Cl.
| | |
|---|---|
| *G05D 1/00* | (2006.01) |
| *G05D 1/02* | (2006.01) |
| *G05D 1/04* | (2006.01) |
| *G01C 21/20* | (2006.01) |
| *B63G 8/00* | (2006.01) |
| *B63G 8/08* | (2006.01) |
| *A01K 61/60* | (2017.01) |

(52) U.S. Cl.
CPC ......... *G05D 1/0088* (2013.01); *A01K 61/60* (2017.01); *B63G 8/001* (2013.01); *B63G 8/08* (2013.01); *G01C 21/203* (2013.01); *G05D 1/0206* (2013.01); *G05D 1/048* (2013.01); *B63G 2008/004* (2013.01)

(58) Field of Classification Search
CPC .... G05D 1/0088; G05D 1/0206; G05D 1/048; B63G 8/001; B63G 8/08; B63G 2008/004; G01C 21/203; A01K 61/60
See application file for complete search history.

(56) References Cited

U.S. PATENT DOCUMENTS

| | | | |
|---|---|---|---|
| 3,230,967 A | 1/1966 | Castro | |
| 3,730,120 A | 5/1973 | Dobell | |
| 7,320,289 B1 | 1/2008 | Clarke | |
| 8,028,660 B2 | 10/2011 | Troy | |
| 9,469,383 B1 | 10/2016 | Cooper et al. | |
| 9,655,347 B2 * | 5/2017 | Troy | A01K 61/65 |

(Continued)

FOREIGN PATENT DOCUMENTS

| | | |
|---|---|---|
| GB | 2493699 | 2/2016 |
| WO | WO2002/040125 | 5/2002 |

(Continued)

OTHER PUBLICATIONS

Lee et al., Design of Autonomous Underwater Vehicles for Cage Aquafarms, Jun. 13-15, 2007, IEEE Intelligent Vehicles Symposium, 2007, pp. 938-943 (Year: 2007).*

(Continued)

*Primary Examiner* — Thomas G Black
*Assistant Examiner* — Sze-Hon Kong
(74) *Attorney, Agent, or Firm* — Fish & Richardson P.C.

(57) ABSTRACT

A computer-implemented method includes receiving data from one or more sensors that detect one or more environmental parameters associated with an autonomous submersible structure, determining one or more navigation parameters based on the one or more environmental parameters and one or more viability profiles associated with cargo contained within the autonomous submersible structure and that specify constraints on the one or more environmental parameters, and controlling, based on the one or more navigation parameters, a propulsion system of the autonomous submersible structure.

20 Claims, 5 Drawing Sheets

(56) References Cited

U.S. PATENT DOCUMENTS

| | | | |
|---|---|---|---|
| 9,908,593 B2 | 3/2018 | Cooper et al. | |
| 2006/0096548 A1* | 5/2006 | Ytterland | A01K 61/60 |
| | | | 119/223 |
| 2006/0102087 A1* | 5/2006 | Page | A01K 61/90 |
| | | | 119/223 |
| 2009/0162455 A1* | 6/2009 | Koppe | A23K 1/188 |
| | | | 424/747 |
| 2009/0235870 A1* | 9/2009 | Troy | F03G 7/05 |
| | | | 119/223 |
| 2012/0006277 A1* | 1/2012 | Troy | A01K 61/65 |
| | | | 119/223 |
| 2012/0072038 A1* | 3/2012 | Kolar | G06F 1/3203 |
| | | | 700/291 |
| 2012/0192779 A1 | 8/2012 | Teppig, Jr. | |
| 2013/0206078 A1* | 8/2013 | Melberg | A01K 61/02 |
| | | | 119/230 |
| 2014/0129031 A1 | 5/2014 | Carter | |
| 2014/0319076 A1 | 10/2014 | Galushko | |
| 2016/0007577 A1* | 1/2016 | Constantz | A01K 63/065 |
| | | | 119/245 |
| 2016/0221186 A1* | 8/2016 | Perrone | B25J 9/1661 |
| 2016/0244130 A1* | 8/2016 | Mood | A01K 63/02 |
| 2017/0295759 A1* | 10/2017 | Hine | A01K 61/80 |
| 2018/0005178 A1* | 1/2018 | Gollu | G06K 7/10366 |
| 2018/0160658 A1* | 6/2018 | Lyngoy | A01K 61/90 |

FOREIGN PATENT DOCUMENTS

| | | |
|---|---|---|
| WO | WO 2005/117573 | 12/2005 |
| WO | WO 2007/042861 | 4/2007 |
| WO | WO 2007042860 | 4/2007 |

OTHER PUBLICATIONS

'www.worldfishing.net' [online] "Technology in waiting," Aug. 31, 2014, [retrieved on Mar. 17, 2017] Retrieved from Internet: URL<http://www.worldfishing.net/news101/Comment/ben-yami/technology-in-waiting> 3 pages.

'www.thefishsite.com' [online] "Self-Propelled Cage for Fish Farming Tested," Sep. 3, 2008, [retrieved on Mar. 16, 2017] Retrieved from Internet: URL<http://www.thefishsite.com/fishnews/7808/selfpropelled-cage-for-fish-farming-tested/> 3 pages.

'www.thefishsite.com' [online] "Self-propelled Aquaculture Cage Debuts in Culebra," Jul. 31, 2008, The Fish Site, [retrieved on Mar. 16, 2017] Retrieved from Internet: URLhttp://www.thefishsite.com/fishnews/7571/selfpropelled-aquaculture-cage-debuts-in-culebra/> 3 pages.

'www.technovelgy.com' [online] "Self-Propelled Underwater Fish Cages," Sep. 11, 2008, [retrieved on Mar. 16, 2017] Retrieved from Internet: URL<http://www.technovelgy.com/ct/Science-Fiction-News.asp?NewsNum=1871> 3 pages.

'www.seagrant.mit.edu' [online] "Self-propelled Aquaculture Cage Debuts in Culebra," Jul. 15, 2008 [retrieved on Mar. 17, 2017] Retrieved from Internet: URL<http://seagrant.mit.edu/press_releases.php?nwsID=54> 2 pages.

'www.portofentry.com' via 'web.archive.org' [online] "USA: MIT tests self-propelled cage for fish farming," Sep. 5, 2008, [retrieved on Mar. 17, 2017] Retrieved from Internet: URL<http://web.archive.org/web/20081119234732/http:/portofentry.com/site/root/resources/industry_news/6983.html> 2 pages.

'www.phys.org,' [online] "MIT tests self-propelled cage for fish farming," Sep. 3, 2008, [retrieved on Mar. 16, 2017] Retrieved from Internet: URL<https://phys.org/news/2008-09-mit-self-propelled-cage-fish-farming.html> 2 pages.

'www.newscientist.com' [online] "Mobile fish farms could soon navigate the oceans," Sep. 4, 2008, [retrieved on Mar. 16, 2017] Retrieved from Internet: URL<https://www.newscientist.com/article/dn14663-mobile-fish-farms-could-soon-navigate-the-oceans/> 3 pages.

'www.fiskerforum.dk' [online] "Self-Propelled cage tests," Nov. 20, 2008, [retrieved on Mar. 16, 2017] Retrieved from Internet: URLhttp://www.fiskerforum.dk/en/news/b/Self-propelled-cage-tests> 1 page.

'www.bizjournals.com' [online] "Maine firm, partners make moveable fish farm for deep-ocean aquaculture," Aug. 14, 2008 [retrieved on Mar. 17, 2017] Retrieved from Internet: URL<http://www.bizjournals.com/boston/blog/mass-high-tech/2008/08/maine-firm-partners-make-moveable-fish-farm.html> 2 pages.

'www.aquafeed.com' [online] "Self-propelled cage for fish farming," Aug. 20, 2008, Suzi Fraser, [retrieved on Mar. 16, 2017] Retrieved from Internet: URL<http://www.aquafeed.com/read-article.php?id=2487&sectionid=1> 3 pages.

* cited by examiner

CONTROL SYSTEMS FOR AUTONOMOUS SUBMERSIBLE STRUCTURES

FIELD

This specification relates to aquaculture.

BACKGROUND

Open ocean aquaculture is a marine farming technique in which fish farms are placed offshore in the open ocean. The farms are typically positioned in deep and unsheltered waters, where ocean currents are stronger than they are inshore. A main advantage of open ocean aquaculture is the dispersion of effluent produced by the fish farms: near-shore aquaculture effluent settles below the farms on the seafloor, potentially damaging local ecosystems. Placing aquaculture in a large body of water also eases the process of obtaining permits, mitigates issues around recreational use for near-shore space, and provides more space for the farms, allowing production to expand and preventing health risks associated with overcrowding, such as injury, disease, and high mortality rates.

SUMMARY

Many aquaculture systems for growing and harvesting fish are moored or anchored to the sea floor. These aquaculture systems, typically including a submersible cage structure containing live fish, are subject to depth limitations, request robust moorings or anchors, and require a human to travel out to the location of the farm to perform maintenance, feed and monitor the fish, and eventually to harvest the fish.

In some implementations, to effectively utilize the environment while ensuring proper care of the live cargo of the structure, a submersible cage structure can be configured to autonomously navigate the ocean or body of water in which the cage is submerged. By using a propulsion system to traverse currents and steer to certain locations, the proposed system provides a mobile aquaculture solution that reduces the need for humans to travel to the submersible cages. The proposed system is not restricted to certain depths, and can navigate to different locations based on a condition of the cargo contained within the system.

In one general aspect, a computer-implemented method includes receiving data from one or more sensors that detect one or more environmental parameters associated with an autonomous submersible structure, determining one or more navigation parameters based on the one or more environmental parameters and one or more viability profiles associated with cargo contained within the autonomous submersible structure and that specify constraints on the one or more environmental parameters, and controlling, based on the one or more navigation parameters, a propulsion system of the autonomous submersible structure.

Implementations may include one or more of the following features. For example, the propulsion system of the autonomous submersible structure comprises two or more independently operated propellers of the autonomous submersible structure. The method can further include receiving data from one or more sensors that detect one or more vital parameters of the cargo. The method can further include determining one or more navigation parameters based on the one or more vital parameters of the cargo and one or more viability profiles associated with the cargo that specify constraints on the one or more vital parameters.

The vital parameters can include at least one of: average body weight per cargo unit, average length per cargo unit, average age of cargo, average density of cargo, average state of cargo, proportion of healthy cargo, proportion of live cargo, or total units of cargo. The method can further include receiving feedback from one or more sensors of a life support system of the submersible structure that controls the one or more vital parameters of the cargo.

In some examples, the one or more environmental parameters comprise at least one of: water salinity, water oxygen level, water pressure, water temperature, and weather conditions. The one or more navigation parameters can include a destination location to which the autonomous submersible structure is navigated. The one or more navigation parameters include a geostationary location at which the autonomous submersible structure is to remain.

In some examples, the method further includes determining that at least one of the one or more environmental parameters is below a threshold level specified by at least one of the one or more viability profiles, in response to the determination, determining a change in the one or more navigation parameters, and controlling the two or more independently operated propellers of the autonomous submersible structure based on the change in the one or more navigation parameters.

The method can further include receiving data from one or more sensors that detect a geographical position of the autonomous submersible structure, wherein the one or more environmental parameters include the geographical position. In some examples, controlling the two or more independently operated propellers of the autonomous submersible structure controls at least one of: a direction of travel of the autonomous submersible structure or a depth of the autonomous submersible structure.

The method can further include determining, by a navigation system, the one or more navigation parameters, wherein the navigation system utilizes a neural network configured to receive as input the one or more environmental parameters and the one or more vital parameters and to select a next action from one or more actions available to be performed in response to the determining of the one or more navigation parameters in accordance with current values of the one or more environmental parameters and the specified constraints.

In some examples, each of the one or more viability profiles specifies a different proportion of live cargo, and wherein each of the one or more viability profiles specifies a different neural network. The method can further include receiving feedback from the navigation system and the two or more propellers of the autonomous submersible structure.

In some examples, the one or more viability profiles are ranked, and the method can further include selecting, based on a ranking of the one or more viability profiles, a particular viability profile. In some examples, the one or more environmental parameters include objects located proximate to the autonomous submersible structure.

In some implementations, a system includes a control system of an autonomous submersible structure that performs operations including receiving data from one or more sensors that detect one or more environmental parameters associated with an autonomous submersible structure, determining one or more navigation parameters based on the one or more environmental parameters and one or more viability profiles associated with cargo contained within the autonomous submersible structure and that specify constraints on the one or more environmental parameters, and controlling, based on the one or more navigation parameters, a propulsion system of the autonomous submersible structure.

In some examples, the propulsion system of the autonomous submersible structure comprises two or more independently operated propellers of the autonomous submersible structure.

In some implementations, at least one computer-readable storage medium encoded with executable instructions that, when executed by at least one processor, cause the at least one processor to perform operations including receiving data from one or more sensors that detect one or more environmental parameters associated with an autonomous submersible structure, determining one or more navigation parameters based on the one or more environmental parameters and one or more viability profiles associated with cargo contained within the autonomous submersible structure and that specify constraints on the one or more environmental parameters, and controlling, based on the one or more navigation parameters, a propulsion system of the autonomous submersible structure.

The details of one or more implementations are set forth in the accompanying drawings and the description, below. Other potential features and advantages of the disclosure will be apparent from the description and drawings, and from the claims.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
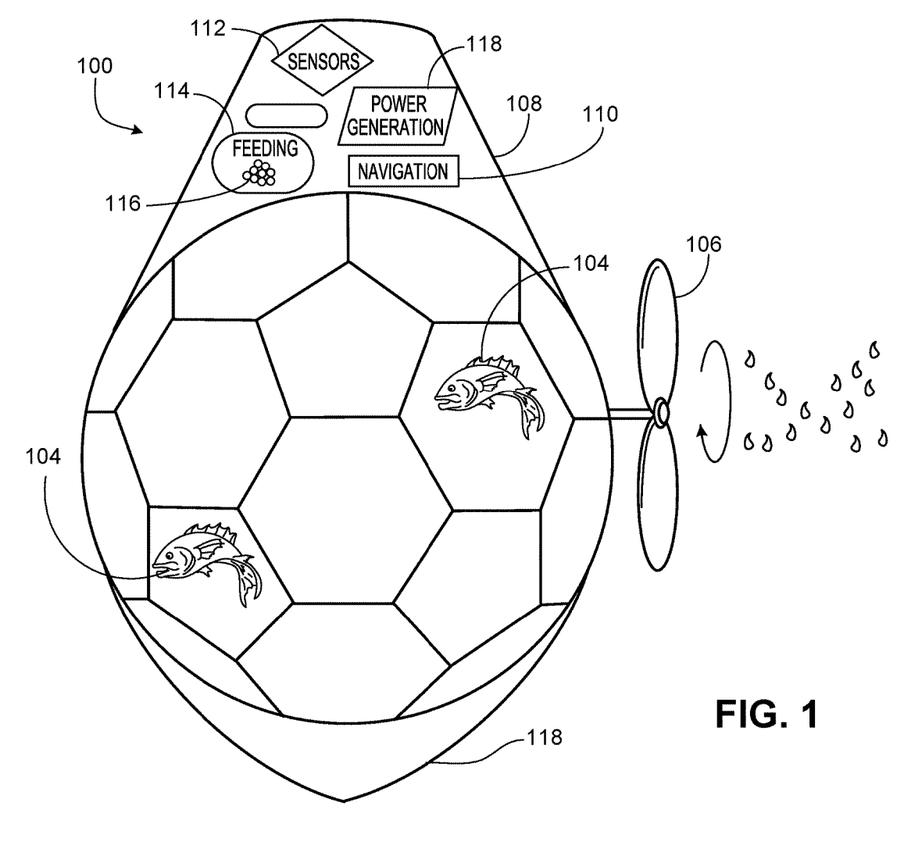
FIGS. 1 and 2 are diagrams of an example configuration of an autonomous submersible structure that contains live aquatic cargo.
Figure 2:
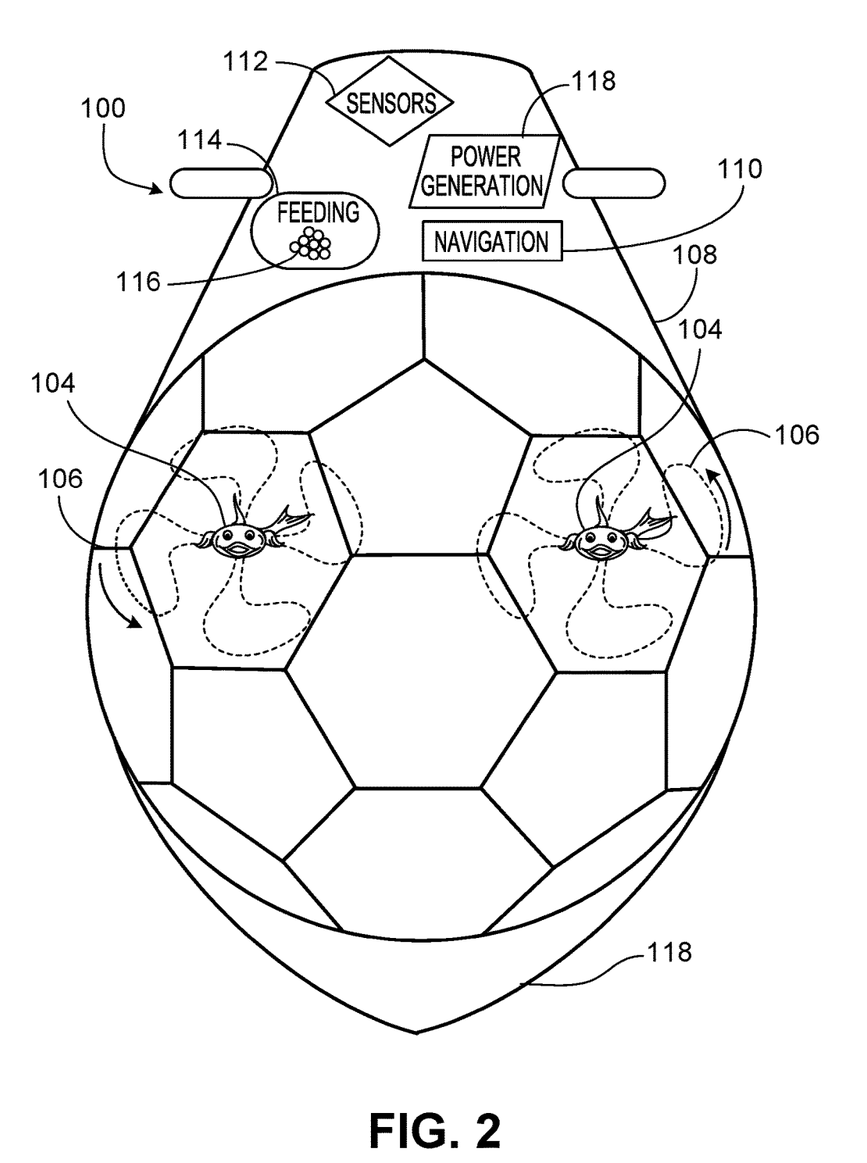

FIGS. 1 and 2 are diagrams of an example configuration of an autonomous submersible structure 100 that contains live aquatic cargo. In this example, the structure 100 is an off-shore cage that contains live fish. The structure 100 is configured to navigate, untethered, in a body of water and to maintain predetermined conditions for the cargo contained within the structure 100 itself. In this particular example, the structure 100 is configured to navigate the open ocean and to maintain optimal water conditions for the live fish.

FIG. 1 illustrates a side view of the structure 100. FIG. 2 illustrates a front view of the structure 100. The structure 100 includes a cage 102, cargo 104, two propellers 106, a conning tower 108, a navigation system 110, a sensors and communications system 112, a feeding mechanism 114, a power generation system 118, and a ballast 120.

The structure 100 is a free-floating structure located in a body of water and is configured to autonomously navigate currents to certain locations. The structure 100 includes the cage 102 for containing cargo 104.

The cargo 104 can be finfish or other aquatic lifeforms. In some implementations, the cargo 104 is juvenile fish, and the length of time the structure 100 is travelling between the starting point and the destination is the length of time required for the cargo 104 to reach maturity. In some implementations, the cargo 104 can be other resources, such as fresh water, relief aid, etc.

In some implementations, the cage 102 has a skeleton covered by a mesh netting. The mesh netting covering the skeleton of the cage 102 can have holes sized based on the cargo 104 contained within the cage 102. For example, if the average size of a homogenous cargo 104 is 12 cm in diameter, the holes of the mesh netting can be 10 cm in diameter to prevent the cargo 104 from exiting the cage 102. In some implementations, the mesh netting covering the skeleton of the cage 102 is made from material that can withstand strong currents, such as iron, steel, etc. In some implementations, the cage 102 does not include mesh netting, and is environmentally sealed to protect the cargo 104 from water.

In some implementations, the cage 102 encompasses a volume of 3,600 ft$^3$. For example, the cage 102 can have a diameter between fifty and seventy feet. In some implementations, the cage 102 has a diameter of 63.66 feet. In some implementations, the cage 102 encompasses a different volume, such as 2,500 ft$^3$, 4,000 ft$^3$, 6,000 ft$^3$, etc., and can have a different diameter, such as twenty feet, forty feet, sixty feet, etc.

The structure 100 is propelled by propellers 106 located on the back of the cage. In some implementations, the propellers 106 are two offset propellers which allow the structure 100 to be steered, as well as change depth. In some implementations, the propellers 106 each have a large diameter relative to the size of the cage 102. For example, the propellers 106 can each have a diameter between 2-10% of the diameter of the cage 102. In some implementations, the propellers 106 each have a diameter between two meters and four meters. In some implementations, the propellers 106 each have a diameter of 3.25 meters.

In some implementations, the propellers 106 have a low rotational velocity relative to typical rotational velocities used by propellers for submersible structures. For example, the propellers 106 can each have a rotational velocity between ten and fifty RPM. For example, the propellers 106 can each have a rotational velocity of thirty RPM. In some implementations, the propellers 106 can each have a different rotational velocity, such as sixty RPM, seventy-five RPM, etc.

By using propellers with large diameters relative to the size of the cage 102 and with low rotational velocities relative to typical rotational velocities, the propulsion system of the structure 100 is more efficient than current propulsion systems on submersible structures. For example, the propulsion system of the structure 100 can be 90% efficient. The high efficiency of the propulsion system reduces the need for power, and allows the structure 100 to use smaller generators. The reduction in power needed reduces the strain on the power generation system 118 of the structure 100 and reduces the weight contained within and the size of the conning tower 108.

In some implementations, the propellers 106 have the same diameter and the same rotational velocity. In some implementations, the propellers 106 can each have different diameters or different rotational velocities.

The systems needed to steer the structure 100 and control the propellers 106 can include sensitive electronic components. In some implementations, the cargo 104 is live and requires feed that must be kept dry.

The conning tower 108 is an environmentally sealed raised platform that houses sensitive components of the structure 100. In some implementations, the conning tower 108 houses the navigation system 110, the sensors and communications system 112, and the feeding mechanism 114. The navigation system 110 and the sensors and communications system 112 can include sensors and electronics sensitive to water damage, and must be kept dry to function. The feeding mechanism 114 can include a feed bin that contains feed 116 for the cargo 104.

In some implementations, the conning tower 108 is mounted atop a supporting structure that serves as a ballast tank and provides a structural transition between the cage 102 and the conning tower 108. In some implementations, the supporting structure surrounds the base of the conning tower 108, and the takes the form of a truncated pentagonal pyramid. In some implementations, the supporting structure takes a different form, such as a dome, a pyramid having a different number of sides, etc.

In some implementations, the conning tower 108 is eight feet in diameter and twenty feet tall. In some implementations, the conning tower 108 has a different diameter of a reasonable size, such as six feet, ten feet, fifteen feet, etc. In some implementations, the conning tower 108 has a different height, such as twelve feet, fifteen feet, thirty feet, etc.

In some implementations, environmentally sealing the entirety of the conning tower 108 for the length of the journey taken by the structure 100 is not possible. In some implementations, a portion of the conning tower 108 containing the most sensitive electronic components, as well as the feed 116 is kept above water at all times.

The navigation system 110 controls the propellers 106 to steer the structure 100. The navigation system 110 is communicatively coupled to the propellers 106. In some implementations, the navigation system 110 is coupled to the propellers 106 through communication buses within environmentally sealed conduits. In some implementations, the navigation system 110 transmits control signals to the propellers 106 wirelessly through various wireless communications methods, such as RF, sonic transmission, electromagnetic induction, etc.

In some implementations, the navigation system 110 can receive feedback from the propellers 106. For example, the navigation system 110 can receive the actual rotational velocity of a propeller of the propellers 106. The navigation system 110 can use the feedback from the propellers 106 to adjust subsequent control signals to the propellers 106.

The navigation system 110 can determine a path through the body of water in which the structure 100 is submerged and corresponding control signals for the propellers 106 locally. In some implementations, the navigation system 110 is communicatively coupled to the sensors and communications system 112, and uses data collected by the sensors and communications system 112 to navigate. In some implementations, the navigation system 110 is coupled to the sensors and communications system 112 through communication buses within environmentally sealed conduits. In some implementations, the navigation system 110 receives sensor data from the sensors and communications system 112 wirelessly through various wireless communications methods, such as RF, sonic transmission, electromagnetic induction, etc.

In some implementations, the navigation system 110 communicates with a remote server through the sensors and communications system 112 to receive new bearings. For example, the sensors and communications system 112 can transmit position data of the structure 100 to a remote server, which processes the data and transmits a new bearing to the navigation system 110. The navigation system 110 can receive the new bearing, process the data, and generate updated control signals for the propellers 106. In some implementations, the navigation system 110 communicates with a remote server through the sensors and communications system 112 to receive new control signals for the propellers 106.

In some implementations, the navigation system 110 can generate updated control signals for the propellers 106 locally, without communicating with a remote server. For example, the navigation system 110 can receive data from the sensors and communications system 112, process the data to determine a new bearing, and generate updated control signals for the propellers 106. In some implementations, the navigation system 112 can navigate the structure 100 without the use of GPS. For example, the navigation system 112 can navigate the structure 100 using positioning data collected by the sensors and communications system 112.

The sensors and communications system 112 collects data and transmits the data to the navigation system 110. The sensors and communications system 112 monitors local water parameters, such as water temperature, salinity, pressure, etc. For example, the sensors and communications system 112 can include a temperature sensor that detects and records the temperature of the water. The sensors and communications system 112 can include sensor arrays and transducers for receiving and transmitting underwater signals for positioning in the body of water in which the structure 100 is submerged and/or communicating between structures 100 and/or with a separate sea vessel, such as a maintenance boat. For example, the sensors and communications system 112 can include sonar sensor arrays that detect the position of the structure 100 in the body of water in which the structure 100 is submerged.

The sensors and communications system 112 can include vision sensors, such as sonar, cameras, etc. that detect objects or acquire images for image analysis by the sensors and communications system 112 or a remote server. For example, the sensors and communications system 112 can include a camera that monitors the activity of the cargo 104.

In some implementations, the sensors and communications system 112 can detect objects near the structure 100. For example, the sensors and communications system 112 can use a sonar sensor array to detect objects on the floor of the body of water in which the structure 100 is submerged. In some implementations, the sensors and communications system 112 can detect currents near the structure 100. For example, the sensors and communications system 112 can use water temperature and pressure data to determine the boundaries of a current.

In some implementations, the sensors and communications system 112 can map out features of the body of water in which the structure 100 is submerged and its floor. For example, the sensors and communications system 112 can use sonar to detect underwater mountains, canyons, etc. and transmit the data to a remote server. The sensors and communications system 112 can communicate with a remote server through various wireless methods, such as RF, sonic transmission, electromagnetic induction, etc.

The navigation system 110 can use the data collected by the sensors and communications system 112 to traverse the body of water in which the structure 100 is submerged. For example, the navigation system 110 can receive data from the sensors and communications system 112 indicating that the structure 100 is currently caught in a fast-moving current, but that the boundary between the current and calm water is 5 m below the center of the structure 100's current position. In this example, the navigation system 110 can generate control signals for the propellers 106 to sink the structure 100 below the boundary of the fast-moving current. The navigation system 112 can steer the structure 100 into or out of currents, based on the desired path of the structure 100.

The navigation system 110 can control the propellers 106 to keep the structure 100 geostationary. For example, in a storm, or other situations in which navigating conditions are suboptimal, the navigation system 110 can receive feedback form the propellers 106 and the sensors and communications system 112 to maintain a position in which the structure is to remain.

The navigation system 110 can control the propellers 106 to change a course of the structure 100. For example, if the structure 100 is called into a docking station for maintenance, the navigation system 110 can receive the coordinates of the docking station and can generate control signals for the propellers 106 to change course for the docking station.

The navigation system 110 controls the propellers 106 to steer the structure 100 based on a condition of the cargo 104. The navigation system 110 can steer the structure 100 based on sensor data received from the sensors and communications system 112 to maintain optimal water quality for the cargo 104. For example, the navigation system 110 can steer the structure 100 to maintain optimal temperature, salinity, and pH for the cargo 104, which, in this example, is salmon. In some implementations, the navigation system 110 can control the propellers 106 to steer the structure 100 based on a dispersion rate of effluent, e.g., liquid waste or sewage, produced by the cargo 104. For example, the sensors and communications system 112 can determine a dispersion rate of effluent using a vision system and transmit the data to the navigation system 110, which determines a course and velocity for the structure 100 based on the data received.

The feeding mechanism 114 contains and dispenses feed 116 for the cargo 104. The feeding mechanism 114 includes a feed bin which contains the feed 116. The feed 116 is selected based on the cargo 104. In some implementations, the feed 116 must be kept dry. In some implementations, the feed bin is pressurized with dry air to keep the feed 116 dry. The feeding mechanism 114 is communicatively coupled to the sensors and communications system 112, and uses data collected by the sensors and communications system 112 to determine feeding parameters. In some implementations, the feeding mechanism 114 is coupled to the sensors and communications system 112 through communication buses within environmentally sealed conduits. In some implementations, the feeding mechanism 114 receives sensor data from the sensors and communications system 112 wirelessly through various wireless communications methods, such as RF, sonic transmission, electromagnetic induction, etc.

The feeding mechanism 114 automatically dispenses the feed 116. In some implementations, the feed 116 is dispensed based on a rate that the feed 116 falls through the water. For example, the feeding mechanism 114 can receive water quality data and position, velocity, and directional data from the sensors and communications system 112. The feeding mechanism 114 can use the water quality data to determine the rate at which the feed 116 is released. In some implementations, the feeding mechanism 114 dispenses the feed 116 based on a feed rate for optimal growth or maintenance of the cargo 104. For example, the feeding mechanism 114 can dispense the feed 116 based on data from the sensors and communications system 112 indicating an optimal rate for growth of fish cargo 104.

The power generation system 118 provides power for each of the propellers 106, the navigation system 110, the sensors and communications system 112, and the feeding mechanism 114.

The power generation system 118 can include generators. In some implementations, the power generation system 118 can use a heat sink engine, using cold water driven to deeper depths for driving its heat exchange. In some implementations, the power generation system 118 can use ocean thermal energy conversion (OTEC) to generate electric power for the various systems of the structure 100. In some implementations, the power generation system 118 can use a solar power system to generate electric power for the various systems of the structure 100. In some implementations, the power generation system 118 uses other renewable energy systems, such as wind, nuclear, etc. In some implementations, the power generation system 118 can use generators powered by resources such as natural gas. In some implementations, the power generation system 118 can be recharged when the structure 100 is serviced, or when maintenance is performed on the structure 100.

The conning tower 108 can be heavy component relative to the rest of the structure 100. Without compensation for the weight of the conning tower 108 that is above water level, the structure 100 can capsize.

The ballast 120 is a component that provides stability to the structure 100, preventing the structure 100 from keeling over. The ballast 120 remains below water level, and counteracts the effects of weight of the structure 100 above water level, especially that of the conning tower 108. In some implementations, the ballast is selected based on the weight of the conning tower 108 and the portion of the conning tower 108 that must be kept above water level.

The ballast 120 is placed at the bottom of the structure 100, and is attached to the cage 102. In some implementations, the ballast 120 is a single weight. In some implementations, the ballast 120 can be a compartment of the cage 102, and the weight of the ballast 120 can be adjusted by adding more material to the compartment. The ballast 120 can be made from heavy material, such as gravel, sand, iron, or other various materials typically used as weights.

Figure 3:
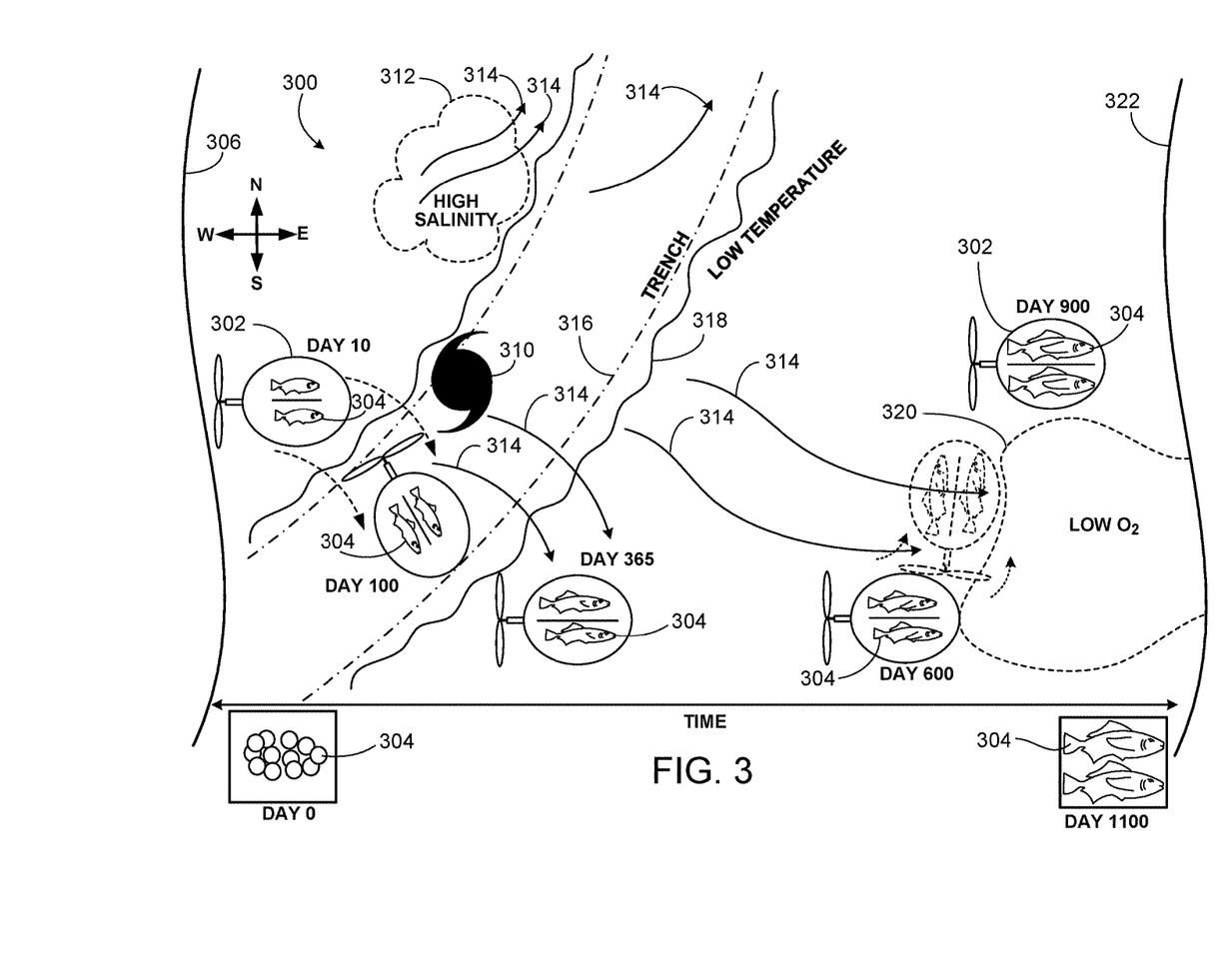
FIG. 3 is a diagram of an example process of the navigation of an autonomous submersible structure that contains live aquatic cargo.

FIG. 3 is a diagram of an example process 300 of the navigation of an autonomous submersible structure that contains live aquatic cargo. In this example, the structure 302 is an off-shore cage that contains live fish 304. The structure 302 can be an embodiment of the structure 100 described with respect to FIGS. 1-2. The live fish 304 can be an embodiment of the cargo 104 described with respect to FIGS. 1-2.

The process 300 begins on day 0. The live fish 304 can be in an early stage of development, such as the egg stage. In some examples, the live fish 304 have already hatched and are in a later stage of development, such as fries, parrs, smolts, etc. In this example, the live fish 304 are put into the structure 302 at a starting location 306. The starting location 306 can be a natural habitat of the live fish 304, a farming location, etc. For example, the live fish 304 can be collected as eggs from a stream 306 and deposited in the structure 302. In some examples, the live fish 304 can be collected as eggs from a fish farm and deposited into the structure 302.

In some examples, the live fish 304 are to be delivered to a destination location 322. For example, the live fish 304 can be deposited into the structure 302 at the starting location 306 at an early stage of development and can be delivered by the structure 302 to the destination location 322 at harvesting maturity. In some examples, the destination location 322 is different from the starting location 306. For example, the live fish 304 can be delivered from North America to a location in Europe. In some examples, the destination location 322 is the same as the starting location 306. The live fish 304 can be sent into a body of water to mature and can be delivered back to the starting location 306 for harvest. For example, the structure 302 can be controlled to drift in the open ocean based on certain parameters.

As the structure 302 drifts in the body of water in which it is submerged, a control system of the structure 302 can control a propulsion system of the structure 302. The propulsion system of the structure 302 can include propellers, such as the propellers described with respect to FIGS. 1-2. The propulsion system of the structure 302 can control the direction of travel, of the structure 302, the depth of the structure 302, etc. For example, the propulsion system can be controlled to navigate the structure 302 around obstacles, undesirable areas of water, etc.

The control system can receive data readings from sensors associated with the structure 302. In some examples, these data readings are received in real-time. In some examples, the sensors are an embodiment of the sensors described with respect to FIGS. 1-2. The data can include readings of environmental parameters, such as the location of the structure 302, the water temperature, water salinity, water pH, water pressure, etc. surrounding the structure 302. In some examples, the sensors are coupled to the structure 302. For example, the sensors can be coupled to the outside of the structure 302 and can travel with the structure 302. In some examples, the sensors are located proximate to the structure 302. For example, the sensors can be placed along an expected path of the structure 302.

The control system can control the propulsion system of the structure 302 according to certain parameters associated with the live fish 304. In some examples, the control system controls the propulsion system of the structure 302 based on viability profiles associated with the live fish 304. These viability profiles can vary based on the live fish 304. For example, salmon 304 can have a different viability profile than tuna 304. The viability profiles include parameters associated with the health and wellbeing of the live fish 304. For example, the viability profiles can include a range of acceptable salinity levels, oxygen levels ($O_2$ levels), water temperature, water pH, etc. In some examples, the parameters are linked to each other. For example, the range of acceptable $O_2$ levels can change according to the water temperature.

The control system can control the propulsion system of the structure 302 based on the viability profiles by comparing parameters in the viability profile with readings taken from the sensors. For example, the control system can receive sensor readings indicating that the water temperature surrounding the structure 302 is under the minimum acceptable water temperature for the live fish 304 in the viability profile and can determine navigation parameters based on these sensor readings. The control system can then can control the propulsion system to navigate the structure 302 to a different area of the body of water in which the structure 302 is submerged based on the navigation parameters.

The navigation parameters can include locations, bearings, depths, etc. For example, the navigation parameters can include a new bearing for the structure 302. The control system can control the propulsion system based on the new bearing to navigate the structure 302. For example, the control system can determine that the new bearing is South by South East (SSE), and can control the propellers of the propulsion system such that the structure 302 is heading SSE.

In some examples, the sensors can provide the control system with predicted values of certain parameters. For example, the sensors can determine that the water in which the structure 302 will be within a day has a salinity above the maximum acceptable salinity for the live fish 304. The sensors can provide the predicted reading to the control system, and the control system can determine navigation parameters that are used to control the propulsion system of the structure 302 to navigate away from that area of water.

The control system can receive data readings from sensors of areas of water in which the cage will be within a certain period of time in real-time. For example, the control system can communicate with sensors located in an area of water by which the structure 302 will pass within an hour and determine that the $O_2$ level is within the optimal range for the live fish 304 based on the viability profile. The control system can determine navigation parameters that are used to control the propulsion system of the structure 302 to navigate the structure 302 to the area of water and can control the structure 302 to remain in the area of water for a period of time.

The control system can receive data readings from sensors in real-time and determine navigation parameters in real-time. For example, if a data reading is received indicating undesirable conditions based on the viability profile, the control system can determine new navigation parameters in real-time to navigate away from the area of water.

In some examples, readings from sensors can indicate weather conditions, such as lightning, hurricanes, tropical storms, tornados, tsunamis, etc. For example, the control system can receive data readings from sensors indicating that the structure 302 will be entering the area of a hurricane within three hours and determine new navigation parameters to steer the structure 302 away from the hurricane.

In some examples, readings from the sensors can indicate obstacles, such as ships, wreckage, reefs, etc. For example, the control system can receive data readings from sensors indicating that the structure 302 will be navigating into a garbage patch and determine new navigation parameters to steer the structure 302 away from the garbage patch.

In some examples, the control system can receive readings from the sensors indicating vital parameters of the live fish 304. For example, the readings can include average size of the live fish 304, average level of maturity of the live fish 304, proportion of the live fish 304 suspected of being ill, etc. The control system can determine navigation parameters based on these readings and based on the viability profiles. For example, if the proportion of the live fish 304 suspected of being ill is higher than a certain threshold, the control system can determine navigation parameters that are used to steer the structure 302 to a medical station or a docking station. In some examples, if the proportion of the live fish 304 that are dead is higher than a certain threshold, the control system can determine navigation parameters that are used to steer the structure 302 to a location, such as the starting location 306.

In some examples, the control system can receive data readings from sensors indicating that a vital parameter of the live fish 304 is outside of an acceptable range, and can determine navigation parameters that are used to steer the structure 302 to change the vital parameter. For example, the control system can determine that the average body temperature of the live fish 304 is below a certain threshold, and can determine navigation parameters used to steer the structure 302 to an area of water with warmer water temperatures.

The control system can control a life support system of the structure 302 that includes systems such as a feeding mechanism. In some examples, the feeding mechanism is an embodiment of the feeding mechanism described with respect to FIGS. 1-2. For example, the control system can receive data readings from sensors indicating that the average weight of the live fish 304 is below an acceptable level, and control the feeding mechanism to dispense larger amounts of feed.

The process 300 continues on day 10. In this example, the live fish 304 have hatched and are in an early stage of development. The structure 302 has kept the live fish 304 alive, but the structure 302 is heading for a hurricane 310. The control system can receive readings from sensors indicating that the hurricane 310 is ahead, and can determine new navigation parameters. In this example, the navigation parameters are used to control the propulsion system of the structure 302 to navigate away from the hurricane 310.

In this example, there is an area of water with high salinity 312 to the North East with strong currents 314. There is also a trench 316 with deep water and high water pressure and surrounded by an area of low water temperature 318. The control system can determine, based on the viability profile, that the live fish 304 cannot survive the high salinity of the area 312. The control system can also determine, based on the viability profile, that the live fish 304 can survive the high water pressure of the trench 316 and low water temperature of the area 318. The control system can then determine new navigation parameters that are used to control the propulsion system of the structure 302 to navigate away from the hurricane 310 and the area 312 and through the trench 316 and area 318.

The process 300 continues on day 100. In this example, the live fish 304 have grown and are still in an early stage of development. The structure 302 is navigating through the trench 316 and the area of low water temperature 318. In this example, the structure 302 is headed for an area with strong currents 314. The control system can receive readings from sensors indicating that the live fish 304 are healthy, and that water conditions of the area of water into which the structure 302 will be navigating over the next few months are favorable based on the viability profile. The control system can then determine navigation parameters that allow the structure 302 to drift with the strong currents 314 to conserve power used to control the propulsion system of the structure 302.

The process 300 continues on day 365. In this example, the live fish 304 have grown. The structure 302 has drifted on the strong currents 314 and is navigating toward the destination location 322. The control system can receive readings from sensors indicating the location of the structure 302 relative to the destination location 322. In some examples, the control system can determine that the structure 302 has completed an acceptable portion of the journey to the destination location 322, and that the structure 302 can continue at the same pace. In some examples, the control system can determine that the structure 302 has completed too large a portion of the journey to the destination location 322 and can determine navigation parameters that are used to control the propulsion system of the structure 302 to navigate more slowly. In some examples, the control system can determine that the structure 302 has completed too small a portion of the journey to the destination location 322 and can determine navigation parameters that are used to control the propulsion system of the structure 302 to navigate more quickly toward the destination location 322.

The process 300 continues on day 600. In this example, the live fish 304 have grown. The structure 300 is headed toward an area of low $O_2$ levels 320. The control system can receive data readings from sensors indicating that the area 320 has $O_2$ levels that are below the acceptable range of $O_2$ levels for the live fish 304 based on the viability profile. In this example, the control system also receives readings indicating that there are strong currents 314 toward the area 320.

In this example, the control system determines new navigation parameters that are used to control the propulsion system to steer the structure 302 away from the area 320 and into the strong currents 314. While the strong currents 314 are toward the area 320, the control system can determine new navigation parameters that are used to control the propulsion system to fight the strong currents 314 such that the structure 302 is steered away from the area 320.

The process 300 continues on day 900. In this example, the live fish 304 have grown and are in a later stage of development. The structure 302 has navigated around the area with low $O_2$ levels 320 and is continuing to navigate toward the destination location 322. In this example, the control system determines that the structure 302 has completed an acceptable portion of the journey toward the destination location 322, and that the live fish 304 have reached an acceptable maturity level based on the viability profile and data readings received from sensors. The control system determines navigation parameters to allow the structure 302 to continue toward the destination location 322.

In some examples, the control system continually determines new navigation parameters for the structure 302. In some examples, the control system determines whether to update the navigation parameters, and will not change previously determined parameters if the control system determines that no update to the navigation parameters is needed.

The process 300 concludes on day 1100. The live fish 304 have reached an acceptable level of growth and are of acceptable levels of health based on the viability profile. For example, the control system can determine based on readings from sensors that the live fish 304 have reached an acceptable average weight and are ready to be harvested. The control system can then determine navigation parameters used to control the propulsion system to deliver the live fish 304 to the destination location 322.

In some examples, the structure 302, now emptied of its cargo of the live fish 304, can be navigated to return to the starting location 306. For example, the control system can determine that the live fish 304 have been delivered and harvested and then determine navigation parameters to return the structure 306 to the starting location 306. In this example, because the structure 302 no longer contains live cargo, the control system can determine navigation parameters based on environmental parameters and in some examples, does not determine the navigation parameters based on the viability profiles. In some examples, the control system can use a different viability profile.

In some examples, the structure 302 can be loaded with different cargo. In such examples, the control system can use a viability profile associated with the new cargo. For example, if the structure 302 is now filled with inanimate cargo that is temperature sensitive, the control system can determine new navigation parameters based on a temperature range specified in the viability profile. In some examples, the structure 302 can be navigated to a different location. For example, the structure 302 can be navigated to a different location to be loaded with different cargo.

Figure 4:
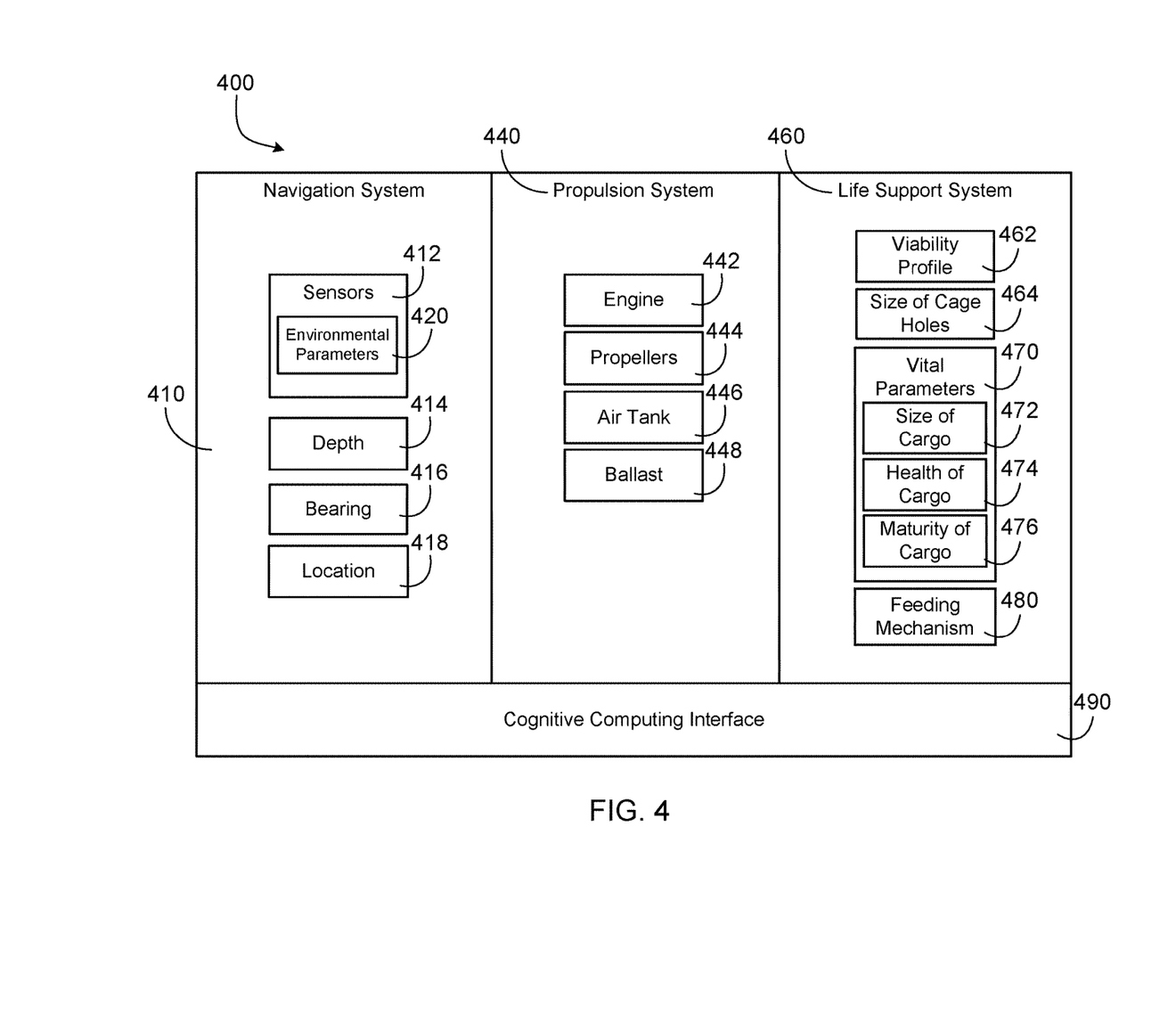
FIG. 4 is a diagram of an example control system of an autonomous submersible structure.

FIG. 4 is a diagram of an example control system 400 of an autonomous submersible structure. In some examples, the autonomous submersible structure is an embodiment of the autonomous submersible structure described with respect to FIGS. 1-3. The control system 400 includes a navigation system 410, a propulsion system 440, and a life support system 460. The navigation system 410, the propulsion system 440, and the life support system 460 are each communicably connected to a cognitive computing interface 490. The interface 490 is configured to transmit data to and receive data from each of the navigation system 410, the propulsion system 440, and the life support system 460. The interface 490 facilitates communication between each of the navigation system 410, the propulsion system 440, and the life support system 460.

The navigation system 410 receives inputs from multiple sources, including a sensor input 412. The sensor input 412 includes an environmental parameter input 420. In some examples, the navigation system 410 receives inputs from more sources. For example, the navigation system 410 can receive input directly from a human operator. In some examples, the navigation system 410 receives inputs from different sources. For example, the navigation system 410 can receive input from models that produce predicted values of inputs. In some examples, the navigation system 410 receives inputs from fewer sources. For example, the navigation system 410 can receive one sensor input 412.

The navigation system 410 uses each input it receives to determine one or more navigation parameters. For example, the navigation system 410 can use the input 412 to determine a depth 414, a bearing 416, and a location 418. In some examples, the sensor input 412 includes data indicating navigation parameters such as the current depth, bearing, and location of the autonomous submersible structure, etc. In some examples, the navigation system 410 determines more parameters. In some examples, the navigation system 410 determines different parameters. For example, the navigation system 410 can determine a speed, a distance to travel, a time period, etc. In some examples, the navigation system 410 determines fewer parameters. For example, the navigation system 410 can determine a bearing 416.

The sensor input 412 can be input received from one or more sensors. In some examples, the sensors that provide the sensor input 412 are an embodiment of the sensors and communications system 112 described with respect to FIGS. 1-2. The sensor input 412 can include predicted values of certain parameters, such as the future salinity of an area of water the autonomous submersible structure is currently traversing. In some examples, the sensor input 412 can be outputs of a statistical model of a certain parameter, such as the predicted strength of a current.

The sensor input 412 can include values of certain parameters collected in real-time. For example, the environmental parameters 420 of the sensor input 412 can include the $O_2$ level of an area of water, the temperature of an area of water, etc. In some examples, the values are collected for an area of water the autonomous submersible structure is currently traversing. In some examples, the values are collected for an area of water the autonomous submersible structure will traverse in the future. For example, the control system can communicate with sensors located in an area of water by which the autonomous submersible structure will pass within an hour.

The sensor input 412 can include values of certain parameters that indicate weather conditions. For example, the environmental parameters 420 can include data indicating weather conditions such as lightning, hurricanes, tropical storms, tornados, tsunamis, etc. For example, the environmental parameters 420 can include data from local weather stations. In some examples, the navigation system 410 can determine weather conditions from a combination of the sensor input 412 received. For example, the navigation system 410 can use a combination of the sensor input 412 received to determine that a currently active hurricane will cross paths with the autonomous submersible structure on its current trajectory.

In some examples, the sensor input 412 can indicate obstacles. For example, the environmental parameters 420 of the sensor input 412 can indicate obstacles such as ships, wreckage, reefs, etc. In some examples, the environmental parameters 420 of the sensor input 412 can indicate the boundaries of a current. For example, the environmental parameters of the sensor input 412 can include density and temperature data for an area of water that the navigation system 410 can use to determine the boundaries of a deep current. In some examples, the environmental parameters 420 can include image or video input. In some examples, the navigation system 410, the cognitive computing interface 490, or a remote server to which the navigation system 410 is communicatively coupled can process the sensor input 412 to determine whether the autonomous submersible structure is approaching an obstacle. For example, the sensor input 412 can include image data of a large garbage patch directly in the path of the autonomous submersible structure. The navigation system 410 can process the sensor input 412 and use image recognition to determine that there is an obstacle that needs to be avoided, and determine one or more navigation parameters that are used to avoid the obstacle.

In some examples, the sensor input 412 can include vital parameters of the live cargo of the autonomous submersible structure. For example, the sensor input 412 can include the average size of the live cargo, the average weight of the live cargo, the average age of the live cargo, the average maturity of the live cargo, etc. In some examples, the navigation system 410, the cognitive computing interface 490, or a remote server to which the navigation system 410 is communicatively coupled can process the sensor input 412 to determine vitality parameters of the live cargo of the autonomous submersible structure. For example, the navigation system 410 can process the sensor input 412 to determine whether units of the live cargo are ill, the proportion of the live cargo that is ill, etc.

The depth output 414 indicates a depth in water of the autonomous submersible structure. The depth output 414 can be measured as a depth from the surface of the water, from the bottom of the ocean, etc. The depth output 414 is determined by the navigation system 410, and is used to control the propulsion system 440 to navigate the autonomous submersible structure in the body of water in which the structure 100 is submerged. In some examples, the depth output 414 is determined by the navigation system 410 using the sensor input 412. For example, the navigation system 410 can determine the boundaries of a strong current in a direction opposite to the current bearing of the autonomous submersible vehicle, and determine that if the autonomous submersible structure sank in depth by five feet, the structure would be able to steer out of the strong current.

In some examples, a portion of the autonomous submersible structure cannot be submerged. For example, a portion of the conning tower of the autonomous submersible structure cannot be submerged. In some examples, the navigation system 410 uses the sensor input 412 to determine how much of the autonomous submersible structure is below water. For example, the navigation system 410 can determine that the autonomous submersible structure is partially submerged, and that the conning tower is still above water. If the navigation system 410 determines a depth output 414 that will submerse the portion of the conning tower that cannot be below water, the navigation system 410, the cognitive computing interface 490, or a remote server to which the control system 400 is communicatively coupled, can determine that the navigation system 410 must determine a new navigation parameter. The new navigation parameter can be determined based on the maximum depth that the autonomous submersible structure can achieve without submerging the portion of the conning tower.

In some examples, a portion of the autonomous submersible structure cannot be above water. For example, the propellers of the autonomous submersible structure cannot be above water. In some examples, the navigation system 410 uses the sensor input 412 to determine how much of the autonomous submersible structure is below water. For example, the navigation system 410 can determine that the autonomous submersible structure is partially submerged, and that the propellers are still submerged. If the navigation system 410 determines a depth output 414 that will force the propellers to breach the surface, the navigation system 410, the cognitive computing interface 490, or a remote server to which the control system 400 is communicatively coupled, can determine that the navigation system 410 must determine a new navigation parameter. The new navigation parameter can be determined based on the minimum depth that the autonomous submersible structure can achieve without exposing the propellers to the surface.

The bearing output 416 indicates a bearing of the autonomous submersible structure. The bearing output 416 can include a direction of motion of the autonomous submersible structure, a direction of a distant object relative to the current course of the autonomous submersible structure, degrees away from North of a distant point relative to the current position of the autonomous submersible structure. The bearing output 416 is determined by the navigation system 410, and is used to control the propulsion system 440 to navigate the autonomous submersible structure in the body of water in which the structure 100 is submerged. In some examples, the bearing output 416 is determined by the navigation system 410 using the sensor input 412. For example, the navigation system 410 can determine the location of a hurricane along the course of travel of the autonomous submersible structure, and determine that if the autonomous submersible structure changed bearing by three degrees toward North, the structure would be able to steer around the hurricane.

The location output 418 indicates a destination location of the autonomous submersible structure. The location output 418 can include global coordinates, an address, etc. The location output 418 is determined by the navigation system 410, and is used to control the propulsion system 440 to navigate the autonomous submersible structure in the body of water in which the structure 100 is submerged. In some examples, the location output 418 is determined by the navigation system 410 using the sensor input 412.

The location output 418 can be the current location of the autonomous submersible structure. For example, the navigation system 410 can determine that environmental conditions, such as salinity and $O_2$ levels are ideal according to one or more viability profiles 462 used by the control system 400. The navigation system 410 can then determine that the autonomous submersible structure has completed an acceptable portion of the journey to the destination location and that the autonomous submersible structure can remain geostationary at its current location.

The location output 418 can be a destination location of the autonomous submersible structure. For example, the navigation system 410 can determine that the autonomous submersible structure has completed an acceptable portion of the journey to the destination location and that the autonomous submersible structure can proceed to the original destination location determined. In this example, the navigation system 410 does not determine a new location output 418, and instead retains the original destination location as the location output 418.

The propulsion system 440 includes an engine 442, independently controlled propellers 444, an air tank 446, and a ballast 448. The interface 490 is configured to transmit data to and receive data from the navigation system 410 and the propulsion system 440 such that the navigation parameters determined by the navigation system 410 are used to control the propulsion system 440.

The propulsion system 440 receives input from multiple sources, including the navigation system 410. For example, the propulsion system 440 can receive a control signal from the navigation system 410. In some examples, the propulsion system 440 can receive the one or more navigation parameters determined by the navigation system 410 and determine a control signal that controls the components of the propulsion system 440. In some examples, the cognitive computing interface 490 receives the one or more navigation parameters determined by the navigation system 410 and determines a control signal for the propulsion system 440.

In some examples, the propulsion system 440 includes a controller that controls all components of the propulsion system 440. For example, the propulsion system 440 can include a central controller that transmits control signals to each of the engine 442, the independently controlled propellers 444, the air tank 446, and the ballast 448. In some examples, the propulsion system 440 includes a controller for each component of the propulsion system 440. For example, the propulsion system 440 can include a separate controller that transmits control signals to each of the engine 442, the independently controlled propellers 444, the air tank 446, and the ballast 448.

The engine 442 is an engine that converts one form of energy into mechanical energy. The engine 442 can be any of various types of engines, such as heat, electric, pneumatic, etc. For example, the engine 442 can be an internal combustion engine, an external combustion engine, an electric motor, etc. In some examples, the engine 442 can be powered by an external power source of the autonomous submersible structure, such as a battery, a fuel tank, an air tank, etc.

The engine 442 can provide power to all components of the control system 400. For example, the engine 442 can provide power to the independently controlled propellers 444, the air tank 446, and the feeding mechanism 480. In some examples, the engine 442 powers only the components of the propulsion system 440. For example, the engine 442 powers the independently controlled propellers 444 and the air tank.

The independently controlled propellers 444 are propellers positioned on the exterior of the autonomous submersible structure that are controlled to propel the autonomous submersible structure through the body of water in which the structure 100 is submerged. In some examples, the independently controlled propellers 444 are an embodiment of the propellers 106 as described with respect to FIGS. 1-2. In some examples, the independently controlled propellers 444 are controlled by the propulsion system 440 to steer the autonomous submersible structure. The independently controlled propellers 444 can be controlled to change the steering, speed, etc. of the autonomous submersible structure.

The independently controlled propellers 444 can be controlled by the propulsion system 440 based on the one or more navigation parameters determined by the navigation system 410. For example, the cognitive computing interface 490 can receive the one or more navigation parameters determined by the navigation system 410 and generate a control signal for the independently controlled propellers 444. In some examples, the propulsion system 440 can receive the one or more navigation parameters and generate a control signal for the independently controlled propellers 444.

The air tank 446 can be a tank filled with air that is used to blow water out of the autonomous submersible structure. In some examples, the air tank 446 contains compressed air that forces water out of the ballast 448. The air tank 446 pushes water through valves of the autonomous submersible structure to increase the buoyancy of the autonomous submersible structure. In some examples, the air tank 446 can be controlled by the propulsion system 440 based on the one or more navigation parameters determined by the navigation system 410. For example, the air tank 446 can be controlled to force air out of the ballast 448 based on a change in depth that decreases the depth of the autonomous submersible structure.

The ballast 448 can be a compartment within the autonomous submersible structure that holds water to provide stability for the submersible structure. In some examples, the ballast 448 is an embodiment of the ballast 118 as described with respect to FIGS. 1-2. In some examples, the ballast 448 can be controlled by the propulsion system 440 based on the one or more navigation parameters determined by the navigation system 410. For example, the ballast 448 can be pumped with water to decrease buoyancy of the autonomous submersible structure if the depth output 414 determined by the navigation system 410 requires an increase in depth of the autonomous submersible structure.

The life support system 460 includes a viability profile 462, size of cage holes 464, vital parameters 470, and feeding mechanism 480. The vital parameters 470 include the size of the cargo 472, the health of cargo 474, and the maturity of cargo 476. The life support system 460 monitors and maintains the integrity of cargo contained within the autonomous submersible structure. For example, the life support system 460 can feed live cargo of the autonomous submersible structure.

The viability profiles 462 include parameters associated with the health and wellbeing of the cargo of the autonomous submersible structure, such as a range of acceptable salinity levels, $O_2$ levels, water temperature, water pH, etc. The parameters of the viability profiles 462 can be linked to each other. For example, an acceptable range of water temperature for a certain kind of live cargo can increase based on a decrease in salinity.

The control system 400 can control the propulsion system 440 of the structure 302 based on the viability profiles 462 by comparing parameters in the viability profile with the sensor inputs 412. In some examples, the cognitive computing interface 490 can control the propulsion system 440 according to the navigation parameters determined by the navigation system 410. For example, the cognitive computing interface 490 can determine from sensor inputs and the navigation parameters determined by the navigation system 410, that the $O_2$ levels in the area of water the autonomous submersible structure is currently traversing is within the ideal range of $O_2$ levels specified in the viability profile 462 used by the control system 400 to control the autonomous submersible structure.

The control system 400 can use more than one viability profile 462. For example, the control system 400 can select a viability profile 462 based on the portion of the journey to the destination location completed by the autonomous submersible structure. In some examples, the control system 400 can select a viability profile 462 based on the cargo contained within the autonomous submersible structure. In some examples, the control system 400 can automatically select a viability profile from the multiple viability profiles 462 based on the one or more navigation parameters determined by the navigation system 410. For example, the control system 400 can select a viability profile 462 based on destination location output 418 determined by the navigation system 410.

The size of the holes in a cage of the autonomous submersible structure 464 can be controlled by the life support system 460. In some examples, the cage is an embodiment of the cage 102 described with respect to FIGS. 1-2. In some examples, the size of the holes in the cage 464 can be controlled by the life support system 460 by altering the structure of the autonomous submersible structure. For example, the life support system 460 can transmit energy through the cage to expand or contract the material of the cage and change the size of the holes 464. In some examples, the cage includes a metal skeleton with a metal covering that can be expanded or contracted to change the size of the holes in the cage 464. In some examples, the cage includes a metal skeleton and a mesh net that can be stretched or eased to change the size of the holes in the cage 464.

The size of the holes 464 can be determined by the life support system 460. For example, the size of the holes 464 can be determined by the life support system 460 based on one or more parameters of the viability profile 462 and the vital parameters 470. For example, the size of the holes 464 can be the minimum size to allow water flow to efficiently dispose of effluent and to provide adequate $O_2$ to the cargo. In some examples, the size of the holes 464 can be determined based on vital parameters 470, such as the size of the cargo 472. For example, if the cargo grows, the size of the holes 464 can be controlled based on the size of the cargo 472.

The vital parameters 470 are monitored by the life support system 460. In some examples, the vital parameters 470 are included in the sensor input 412 collected by the navigation system 410. For example, the vital parameters 470 can be determined from image data collected by sensors and included in the sensor input 412. The vital parameters 470 can be an embodiment of the vital parameters described with respect to FIG. 3. In some examples, the vital parameters 470 are collected as raw data. For example, the vital parameters 470 can include the amount of food consumed each day. In some examples, the vital parameters 470 can be determined from raw sensor data collected. For example, the vital parameters 470 can include the proportion of live cargo contained in the autonomous submersible structure that is healthy. In some examples, the life support system 460 uses techniques such as machine learning to determine certain vital parameters 470. The life support system 460 can use any of a variety of models such as decision trees, linear regression, neural networks, Bayesian networks, etc., and can be trained using a variety of approaches, such as deep learning, inductive logic, support vector machines, clustering, etc. For example, the life support system 460 can determine vital parameters 470 such as the average size of the cargo 472 through image recognition. In some examples, the vital parameters 470 are included as parameters of the viability profiles 462.

In some examples, the cognitive computing interface 490 uses the vital parameters 470 to generate and/or update the viability profiles 462. For example, the cognitive computing interface 490 can determine that a vital parameter has reached a new maximum, and that a new viability profile 462 should be used by the navigation system 410 and the cognitive computing interface 490 to steer the autonomous submersible structure.

The size of the cargo 472 can be monitored by the life support system 460. In some examples, the size of the cargo 472 can include a measurement of the entire cargo. For example, the size of the cargo 472 can include a volume of the total cargo contained within the autonomous submersible structure. In some examples, the size of the cargo 472 can include a measurement of the average size of each unit of cargo. For example, the size of the cargo 472 can include an average length of each unit of cargo contained within the autonomous submersible structure.

The health of the cargo 474 can be monitored by the life support system 460. In some examples, the health of the cargo 474 can include a proportion of healthy cargo contained within the autonomous submersible structure. In some examples, the health of the cargo 474 can include an indication of the various states of health of the cargo. For example, the health of the cargo 474 can include the illnesses that are suspected.

The maturity of the cargo 476 can be monitored by the life support system 460. In some examples, the maturity of the cargo 476 can include a proportion of cargo that has reached a benchmark maturity level. For example, the maturity of the cargo 472 can include a proportion of cargo that has reached spawning adulthood. In some examples, the maturity of the cargo 474 can include an indication of the various stages of maturity of the cargo. For example, the maturity of the cargo 474 can include the growth stages that are represented within the cargo.

The feeding mechanism 480 can be monitored and controlled by the life support system 460. In some examples, the feeding mechanism 480 is an embodiment of the feeding mechanism 114 described with respect to FIGS. 1-2. In some examples, the feeding mechanism 480 is a container that cannot be submerged. For example, the feeding mechanism 480 includes dry feed that will spoil when exposed to water. In some examples, the feeding mechanism 480 includes a mechanism that can be controlled by the life support system 460 to dispense feed to the live cargo contained within the autonomous submersible structure. In some examples, the feeding mechanism 480 is powered by the engine 442. In some examples, the feeding mechanism 480 is powered by an external power source.

Figure 5:
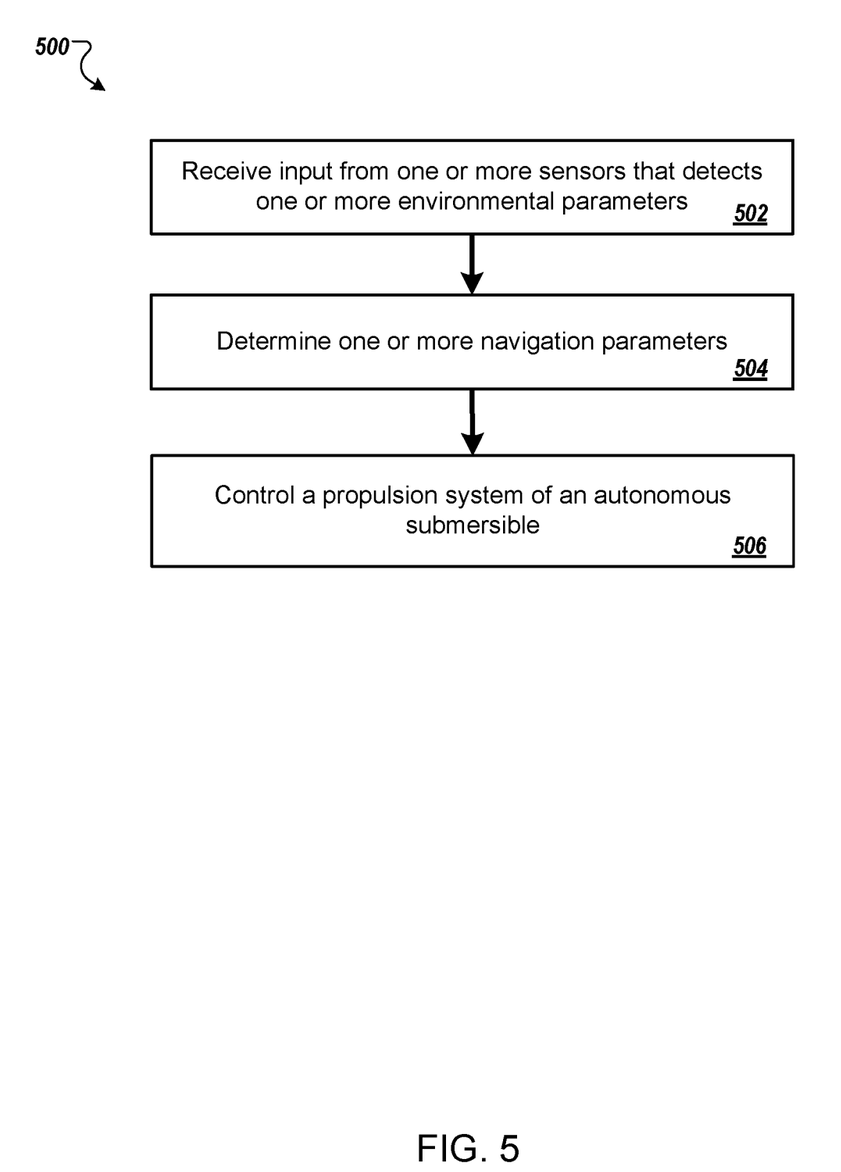
FIG. 5 is a flow chart of an example process 500 of the navigation of an autonomous submersible structure that contains live aquatic cargo.

FIG. 5 is a flow chart of an example process 500 of the navigation of an autonomous submersible structure that contains live aquatic cargo. Briefly, according to an example, the process 500 begins with receiving input from a sensor that detects one or more environmental parameters (502). For example, the control system 400 can receive input from a sensor that detects water temperature.

The process 500 continues with determining one or more navigation parameters (504). For example, the navigation system 410 can use the water temperature and one or more viability profiles 462 to determine that the live cargo needs higher water temperature, and that in order to achieve the higher water temperature, the autonomous submersible structure needs to steer to an area of water south of the area of water it is currently traversing.

The process 500 concludes with controlling a propulsion system of an autonomous submersible structure (506). For example, the control system 400 can use the cognitive computing interface 490 to use the navigation parameters determined by the navigation system 410 to control the propulsion system 440. The propulsion system 440 can then steer the autonomous submersible structure to the area of water south of the area of water it is currently traversing.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method comprising:
   receiving data from one or more sensors that detect one or more environmental parameters that are currently associated with an autonomous submersible structure that contains a particular species of live fish;
   accessing a viability profile that is specific to the particular species of live fish contained in the autonomous submersible structure, and that indicates, for at least one of the environmental parameters, a respective range of values that is indicated as acceptable for the health or well-being of the particular species of live fish;
   determining to reposition the autonomous submersible structure based at least on (i) the one or more environmental parameters that are currently associated with the autonomous submersible structure that contains the particular species of live fish, and (ii) the viability profile that is specific to the particular species of live fish contained in the autonomous submersible structure, and that indicates, for at least one of the environmental parameters, a respective range of values that is characterized as acceptable for the health or well-being of the particular species of live fish; and
   based on determining to reposition the autonomous submersible structure, controlling a propulsion system of the autonomous submersible structure to reposition the autonomous submersible structure.

2. The method of claim 1, wherein different species of fish have different viability profiles.

3. The method of claim 1, wherein determining to reposition the autonomous submersible structure comprises determining to change a depth of the autonomous submersible structure based at least on the viability profile indicating a range of depth values or water pressure values that are characterized as acceptable for the health or well-being of the particular species of live fish.

4. The method of claim 1, wherein determining to reposition the autonomous submersible structure comprises determining to change a geographic position of the autonomous submersible structure based at least on the viability profile indicating a range of salinity, oxygen level, water temperature, or water pH values that are characterized as acceptable for the health or well-being of the particular species of live fish.

5. The method of claim 1, wherein determining to reposition the autonomous submersible structure comprises determining to change a bearing of the autonomous submersible structure based at least on the viability profile indicating a range of water current speed values that are characterized as acceptable for the health or well-being of the particular species of live fish.

6. The method of claim 1, wherein determining to reposition the autonomous submersible structure is further based on (iii) real-time data characterizing a current health or well-being of the live fish contained within the autonomous submersible structure.

7. The method of claim 1, wherein the real-time data characterizing the current health or well-being of the live fish within the autonomous submersible structure comprises an average body weight the live fish, an average length of the live fish, an average age of the live fish, an average density of the live fish, a proportion of the live fish that are characterized as healthy, or a total quantity of the live fish.

8. The method of claim 1, wherein determining to reposition the autonomous submersible structure comprises determining an ultimate destination where the autonomous submersible structure will be off-loaded.

9. A system comprising:
a control system of an autonomous submersible structure that performs operations comprising:
receiving data from one or more sensors that detect one or more environmental parameters that are currently associated with an autonomous submersible structure that contains a particular species of live fish;
accessing a viability profile that is specific to the particular species of live fish contained in the autonomous submersible structure, and that indicates, for at least one of the environmental parameters, a respective range of values that is indicated as acceptable for the health or well-being of the particular species of live fish;
determining to reposition the autonomous submersible structure based at least on (i) the one or more environmental parameters that are currently associated with the autonomous submersible structure that contains the particular species of live fish, and (ii) the viability profile that is specific to the particular species of live fish contained in the autonomous submersible structure, and that indicates, for at least one of the environmental parameters, a respective range of values that is characterized as acceptable for the health or well-being of the particular species of live fish; and
based on determining to reposition the autonomous submersible structure, controlling a propulsion system of the autonomous submersible structure to reposition the autonomous submersible structure.

10. The system of claim 9, wherein different species of fish have different viability profiles.

11. The system of claim 9, wherein determining to reposition the autonomous submersible structure comprises determining to change a depth of the autonomous submersible structure based at least on the viability profile indicating a range of depth values or water pressure values that are characterized as acceptable for the health or well-being of the particular species of live fish.

12. The system of claim 9, wherein determining to reposition the autonomous submersible structure comprises determining to change a geographic position of the autonomous submersible structure based at least on the viability profile indicating a range of salinity, oxygen level, water temperature, or water pH values that are characterized as acceptable for the health or well-being of the particular species of live fish.

13. The system of claim 9, wherein determining to reposition the autonomous submersible structure comprises determining to change a bearing of the autonomous submersible structure based at least on the viability profile indicating a range of water current speed values that are characterized as acceptable for the health or well-being of the particular species of live fish.

14. The system of claim 9, wherein determining to reposition the autonomous submersible structure is further based on (iii) real-time data characterizing a current health or well-being of the live fish contained within the autonomous submersible structure.

15. The system of claim 9, wherein the real-time data characterizing the current health or well-being of the live fish within the autonomous submersible structure comprises an average body weight the live fish, an average length of the live fish, an average age of the live fish, an average density of the live fish, a proportion of the live fish that are characterized as healthy, or a total quantity of the live fish.

16. The system of claim 9, wherein determining to reposition the autonomous submersible structure comprises determining an ultimate destination where the autonomous submersible structure will be off-loaded.

17. At least one non-transitory computer-readable storage medium encoded with executable instructions that, when executed by at least one processor, cause the at least one processor to perform operations comprising:
receiving data from one or more sensors that detect one or more environmental parameters that are currently associated with an autonomous submersible structure that contains a particular species of live fish;
accessing a viability profile that is specific to the particular species of live fish contained in the autonomous submersible structure, and that indicates, for at least one of the environmental parameters, a respective range of values that is indicated as acceptable for the health or well-being of the particular species of live fish;
determining to reposition the autonomous submersible structure based at least on (i) the one or more environmental parameters that are currently associated with the autonomous submersible structure that contains the particular species of live fish, and (ii) the viability profile that is specific to the particular species of live fish contained in the autonomous submersible structure, and that indicates, for at least one of the environmental parameters, a respective range of values that is characterized as acceptable for the health or well-being of the particular species of live fish; and
based on determining to reposition the autonomous submersible structure, controlling a propulsion system of the autonomous submersible structure to reposition the autonomous submersible structure.

18. The medium of claim 17, wherein different species of fish have different viability profiles.

19. The medium of claim 17, wherein determining to reposition the autonomous submersible structure comprises determining to change a depth of the autonomous submersible structure based at least on the viability profile indicating a range of depth values or water pressure values that are characterized as acceptable for the health or well-being of the particular species of live fish.

20. The medium of claim 17, wherein determining to reposition the autonomous submersible structure comprises determining to change a geographic position of the autonomous submersible structure based at least on the viability profile indicating a range of salinity, oxygen level, water temperature, or water pH values that are characterized as acceptable for the health or well-being of the particular species of live fish.

\* \* \* \* \*